Nov. 8, 1932.  N. GREENWELL  1,886,877
CONTROL MECHANISM FOR ENGINES
Filed May 7, 1930   12 Sheets-Sheet 4
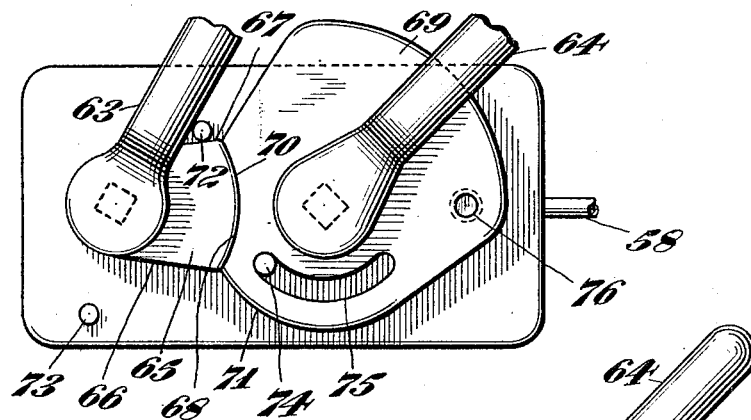
Fig. 4.
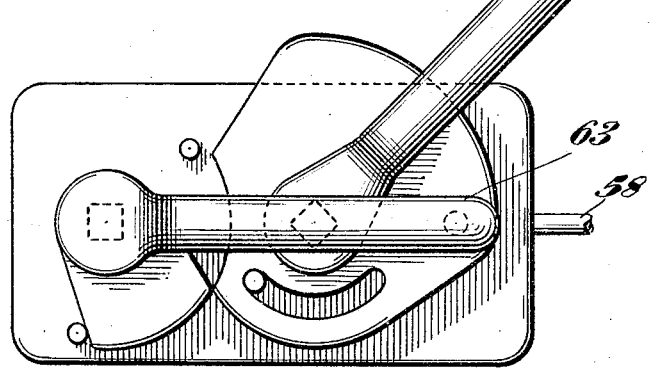
Fig. 5.
Fig. 6.
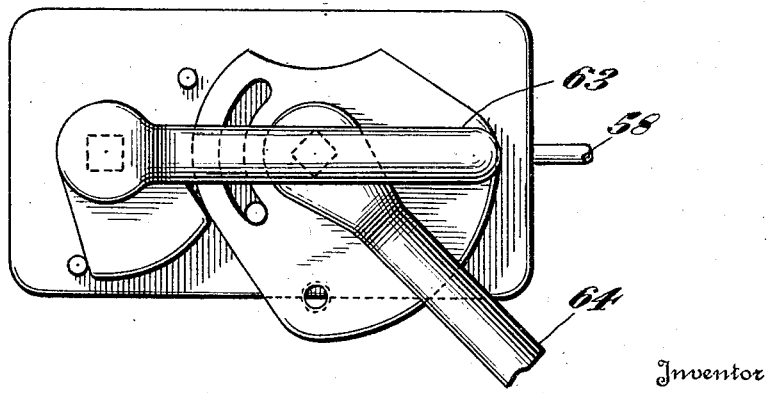
Inventor
Nevil Greenwell.
By R. S. C. Dougherty.
Attorney

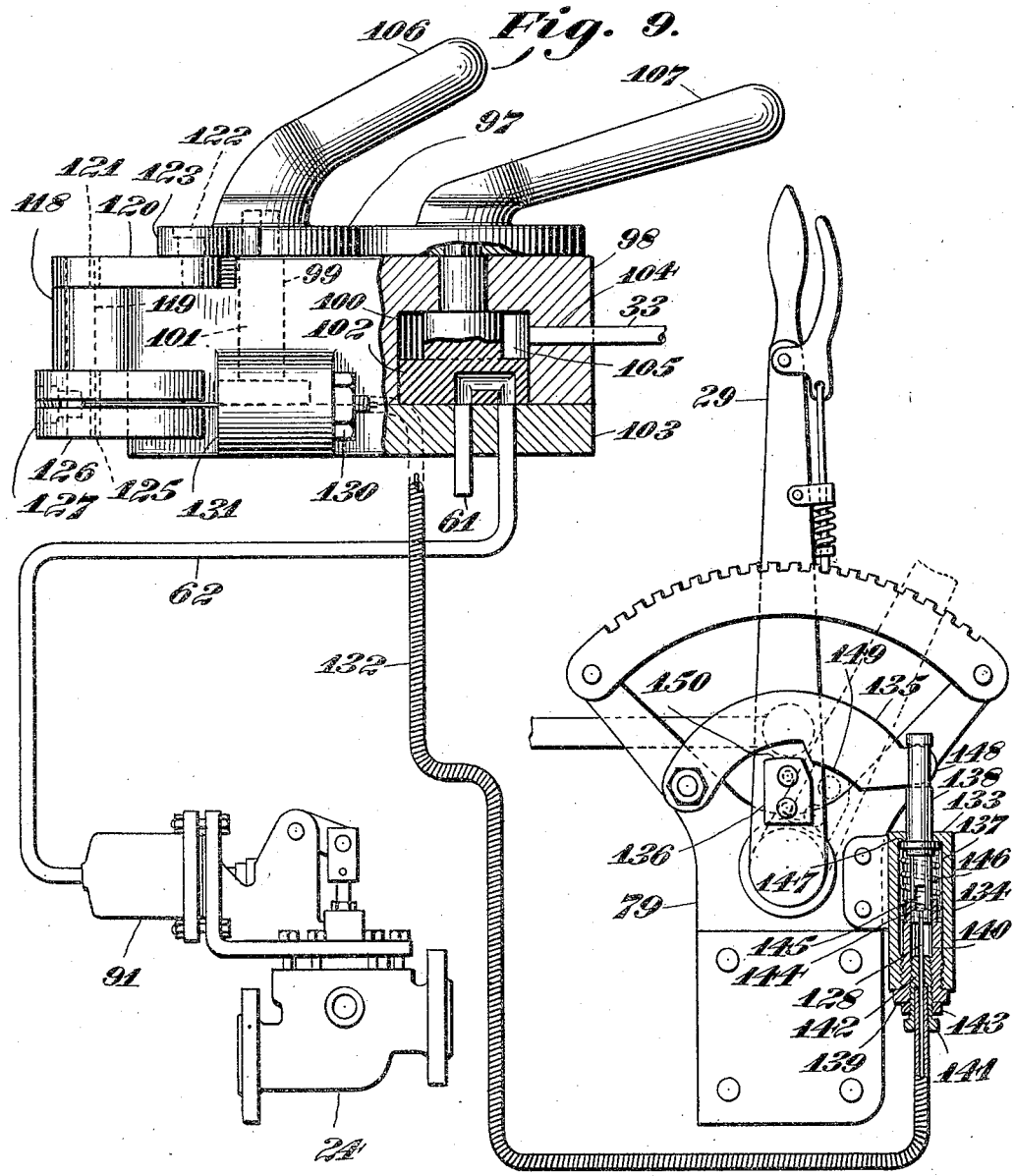

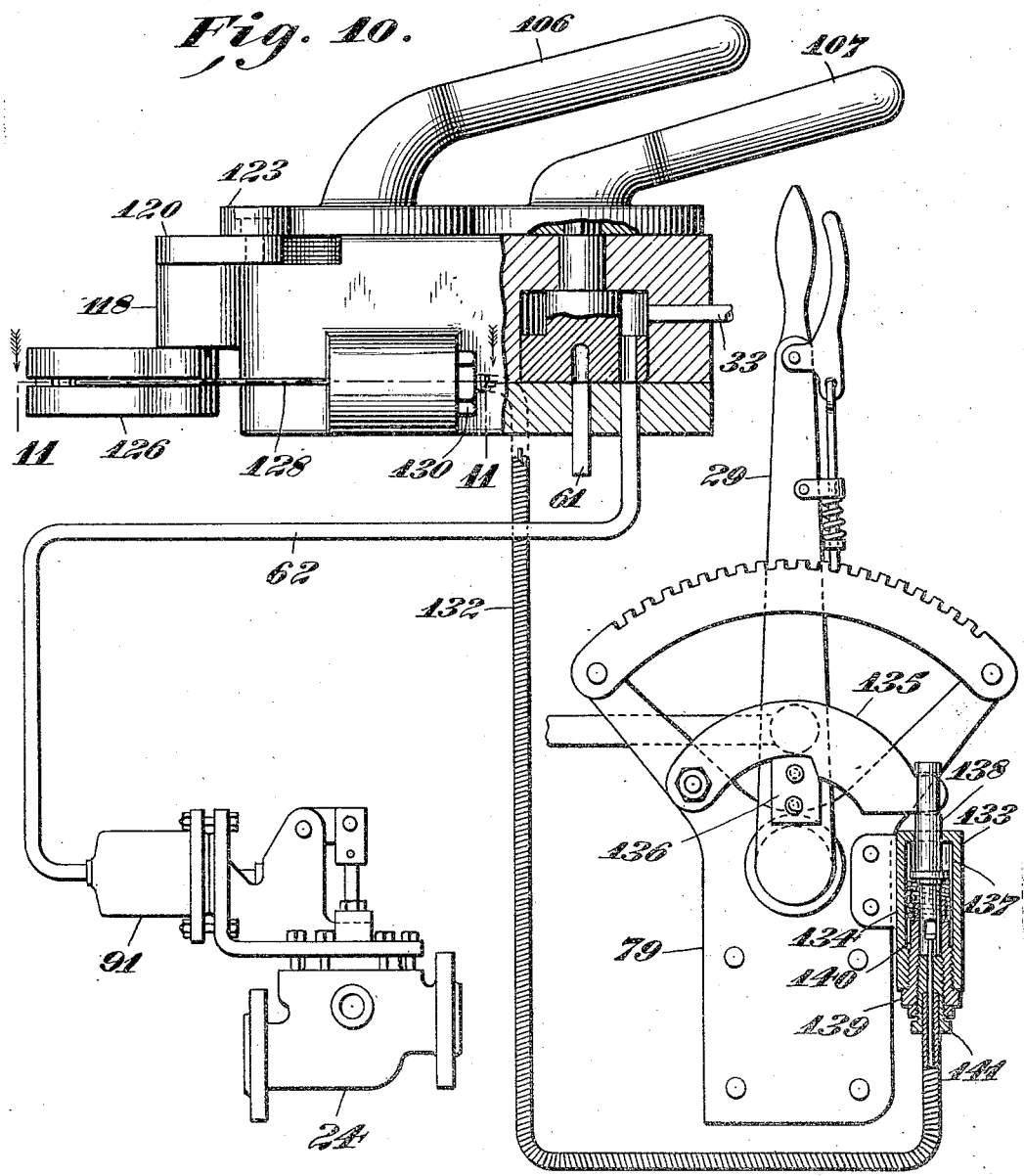

Nov. 8, 1932.    N. GREENWELL    1,886,877
CONTROL MECHANISM FOR ENGINES
Filed May 7, 1930    12 Sheets-Sheet 7

Inventor
Nevil Greenwell.

By R. S. C. Dougherty.
Attorney

Nov. 8, 1932.   N. GREENWELL   1,886,877
CONTROL MECHANISM FOR ENGINES
Filed May 7, 1930   12 Sheets-Sheet 8
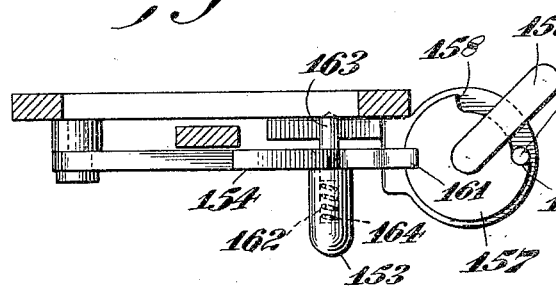
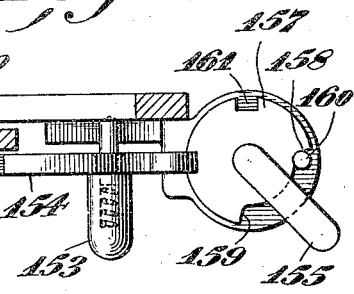
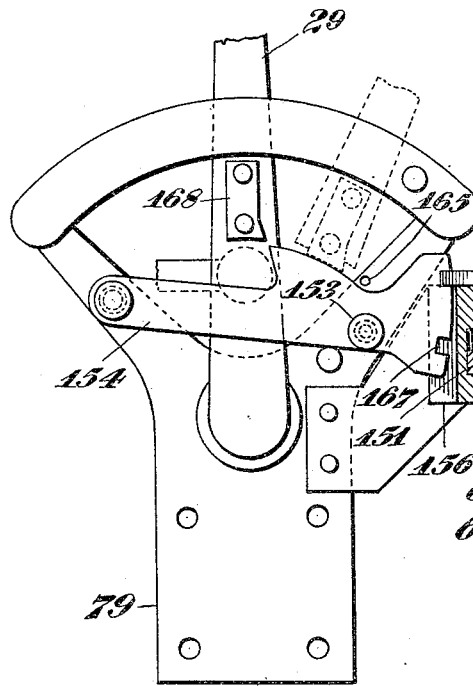
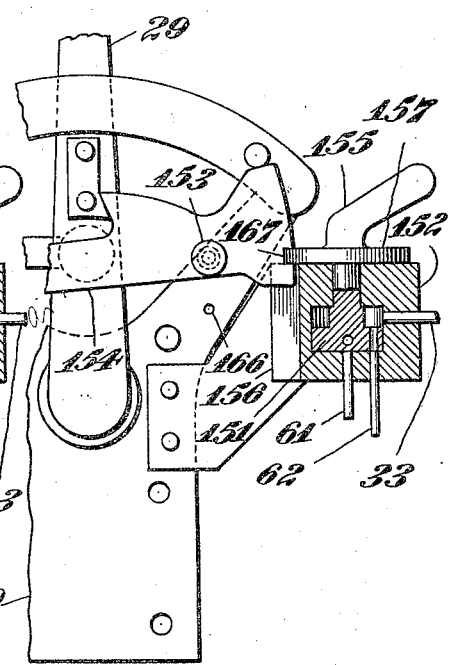
Inventor
Nevil Greenwell.
By R. S. C. Dougherty.
Attorney

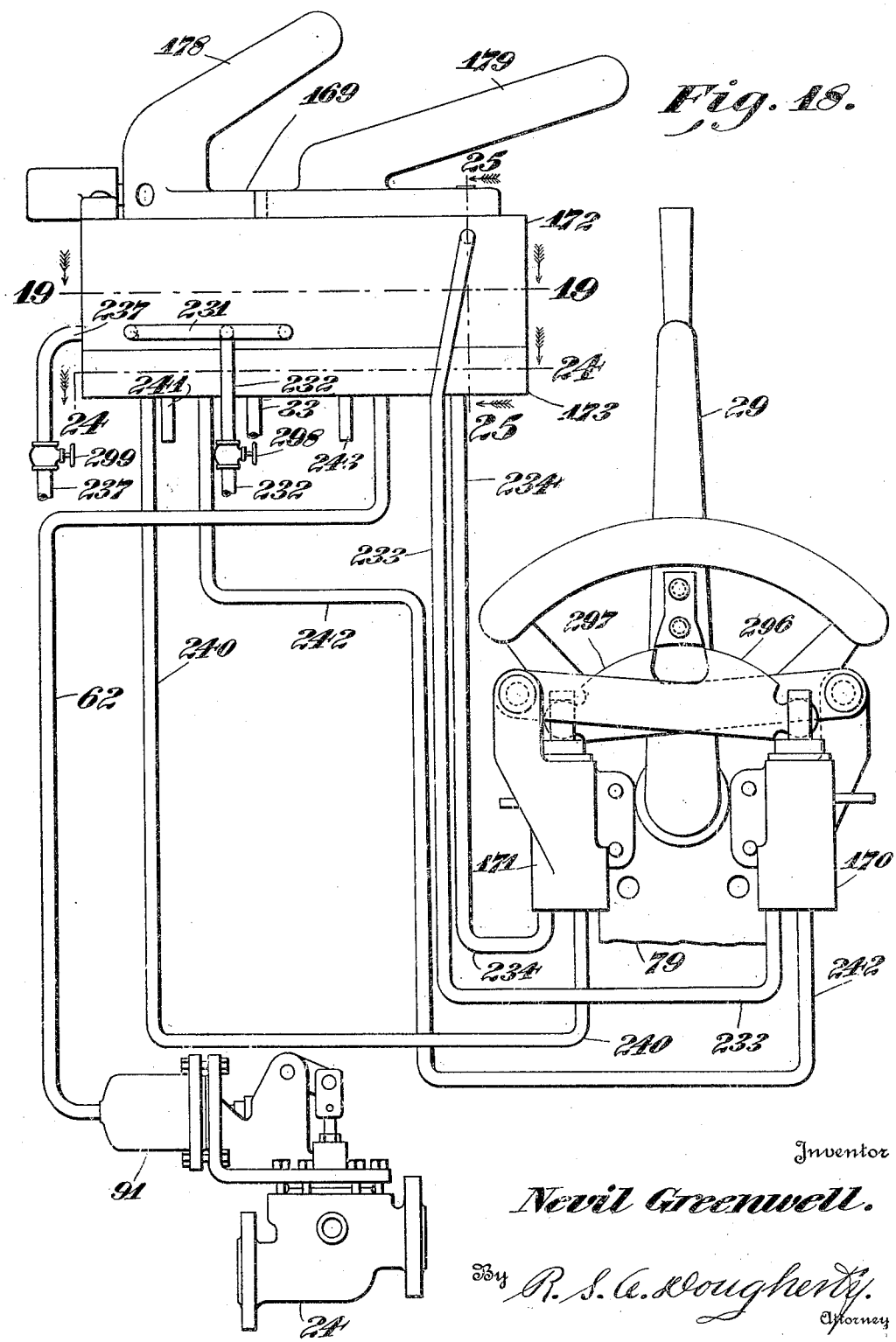

Nov. 8, 1932.   N. GREENWELL   1,886,877
CONTROL MECHANISM FOR ENGINES
Filed May 7, 1930   12 Sheets-Sheet 10

Inventor
Nevil Greenwell.
By R. S. C. Dougherty,
Attorney

Nov. 8, 1932. N. GREENWELL 1,886,877
CONTROL MECHANISM FOR ENGINES
Filed May 7, 1930   12 Sheets-Sheet 11

Inventor
Nevil Greenwell.
By R. S. C. Dougherty
Attorney

Nov. 8, 1932.  N. GREENWELL  1,886,877
CONTROL MECHANISM FOR ENGINES
Filed May 7, 1930  12 Sheets-Sheet 12
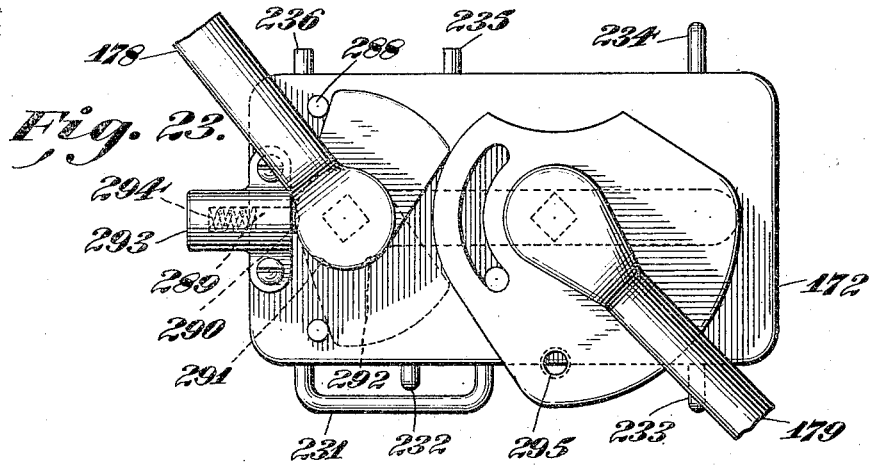
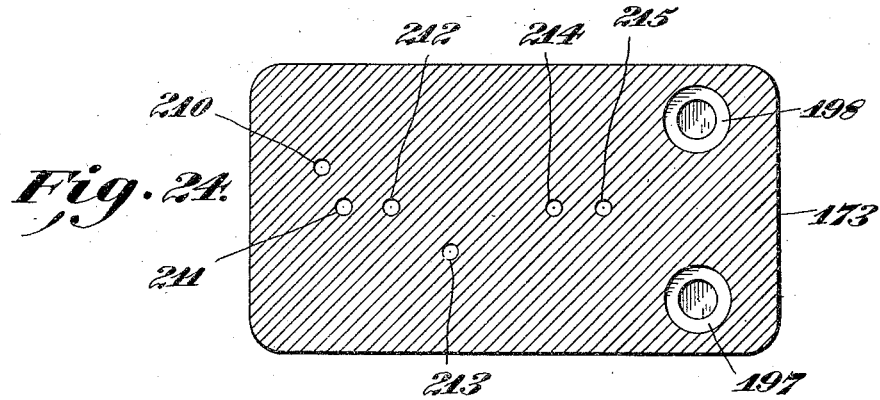
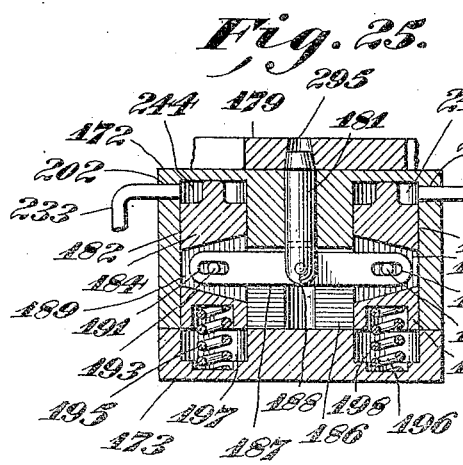
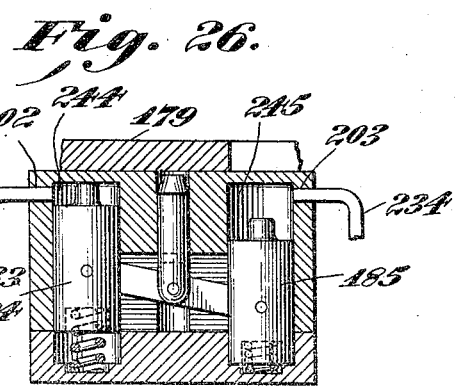
Inventor
Nevil Greenwell.
By R. S. C. Dougherty.
Attorney Patented Nov. 8, 1932

1,886,877

UNITED STATES PATENT OFFICE

NEVIL GREENWELL, OF BETHLEHEM, PENNSYLVANIA, ASSIGNOR TO BETHLEHEM STEEL COMPANY, A CORPORATION OF PENNSYLVANIA

CONTROL MECHANISM FOR ENGINES

Application filed May 7, 1930. Serial No. 450,430.

My invention relates to controlling mechanism for engines, and particularly to controlling mechanism for engines used as auxiliary propulsion units to increase the tractive force of railway locomotives when making grades or the like. Usually such auxiliary propulsion units are normally disconnected from the main locomotive and are adapted to be entrained therewith at the will of the engineer. The primary object of my invention is to provide means to assure the engineer that when it is intended to use the main locomotive in its normal operation, without the auxiliary, the latter is precluded from being operated inadvertently.

Another object of my invention is to provide a controlling mechanism for preventing the auxiliary engine from being operated in one direction when the main locomotive is set for operation in the opposite direction and also for precluding the operation of the main locomotive in one direction in the event that the auxiliary engine happens to be set for operation in the opposite direction.

Another object of my invention is to provide a propulsion system having a main engine and an auxiliary engine normally disconnected from the main engine adapted to be operatively connected thereto wherein means are provided whereby the main engine is untrammeled in its range of operation, when it is desired to operate it without the auxiliary, but, when it is desired to have united operation of the engines, the range of operation of the main engine is restricted.

Another object of my invention is to provide a master control for the operating mechanism to assure the engineer, when the main engine control is in a condition for full range of operation, that the auxiliary engine can not be operated.

Another object of my invention is to provide a means adapted to be set in one position to limit the range of operation of the main engine when it is desired to operate the auxiliary engine, and when set in another position precludes the operation of the auxiliary engine while the main engine is in condition for full range of operation.

Another object of my invention is to provide a means to positively restrict the operation of a main locomotive while the auxiliary engine is in a condition for operation.

A still further object of my invention is to provide a master control which operates to automatically cooperate the operation of the auxiliary engine with respect to the operation of the main engine when it is desired to operate the engines together.

Other objects and novel features of my invention will appear hereinafter and will be more fully understood from the following description and claims taken with the drawings in which:—

Figs. 4, 5 and 6 show a plan view of the master control lever and the throttle control lever of the device shown in Fig. 2 in their different operating positions.

Figure 2:
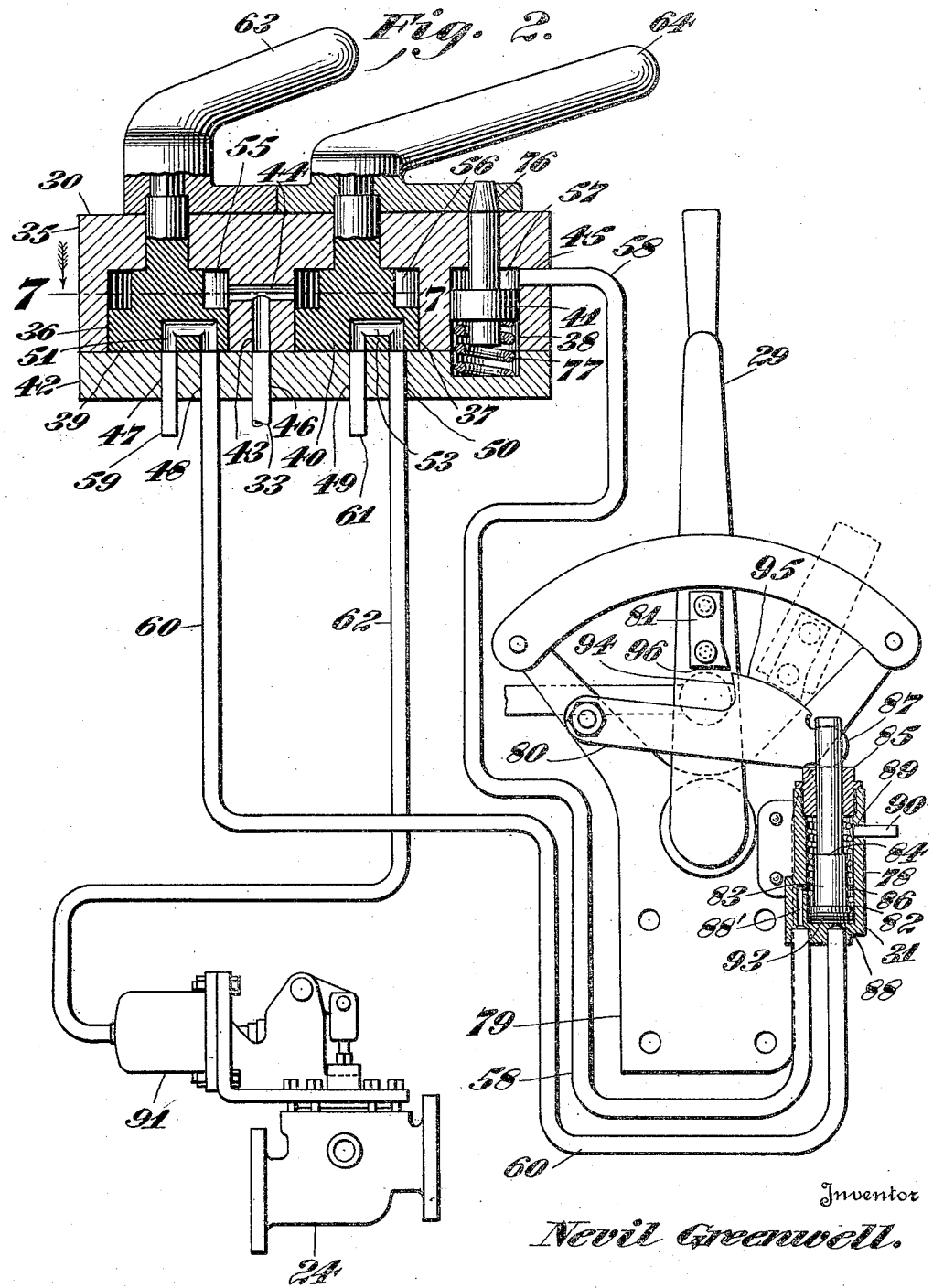
Fig. 2 illustrates diagrammatically one embodiment of my invention, when not in use, as arranged for fluid operation of the control mechanism of a one-way auxiliary steam engine.
Figure 3:
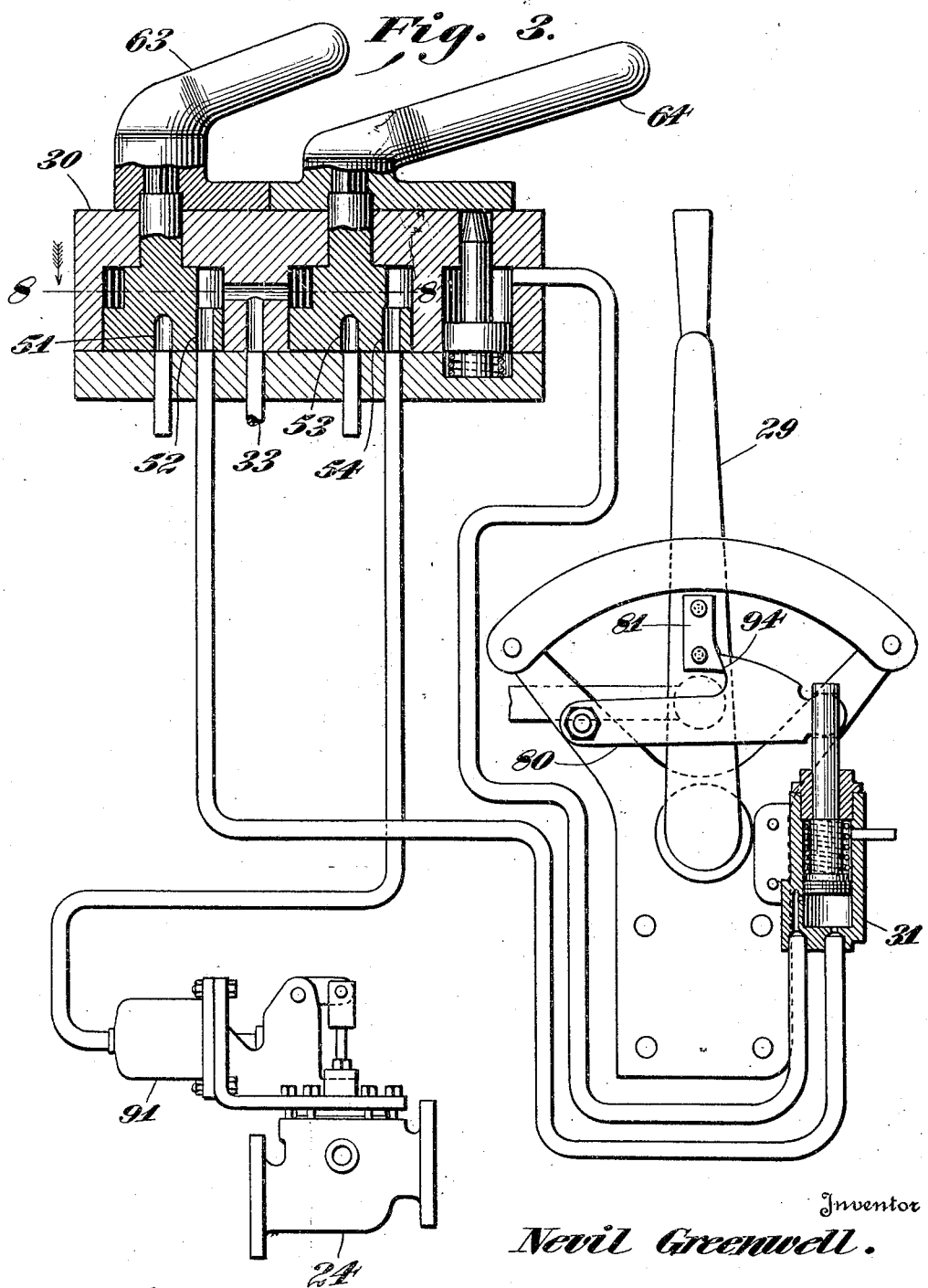
Fig. 3 is the same device as in Fig. 2 but shown in position with the auxiliary steam engine in use.

Figs. 7 and 8 show diagrammatically the arrangement of the air ports of the control valves when taken along the lines 7—7 and 8—8 of Figs. 2 and 3 respectively, and in their respective operating positions.

Figure 11:
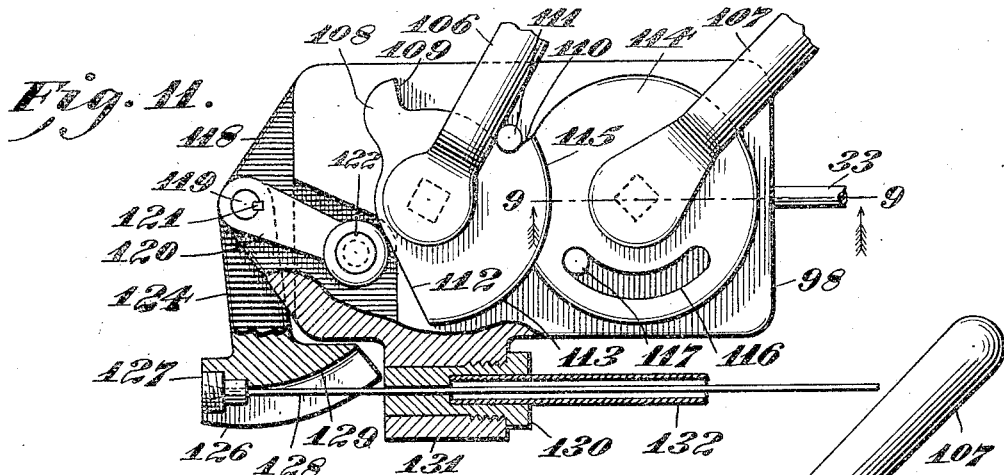

Fig. 9 illustrates diagrammatically and in part section along the line 9—9 of Fig. 11 another embodiment of my invention, when not in use, as arranged for mechanical operation of the master control with fluid operation of the throttle valve control of a one-way auxiliary steam engine.

Fig. 10 is the same device as in Fig. 9 but shown in position with the auxiliary steam engine in use.

Figure 12:
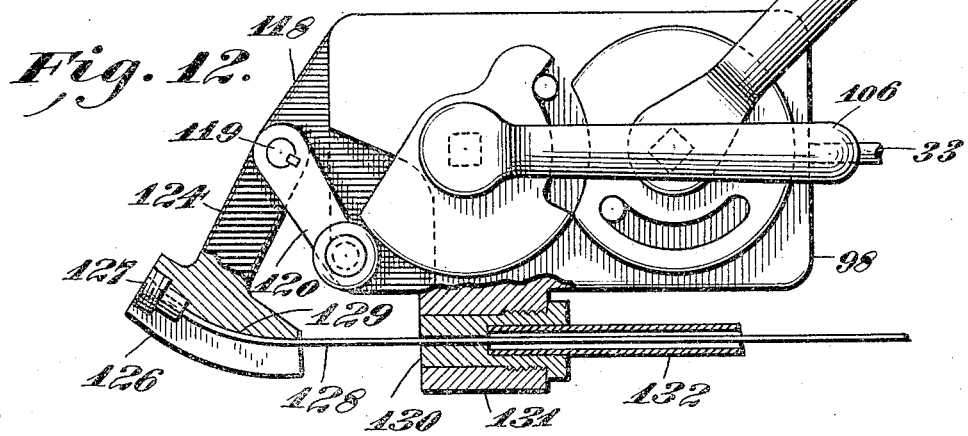
Figure 13:
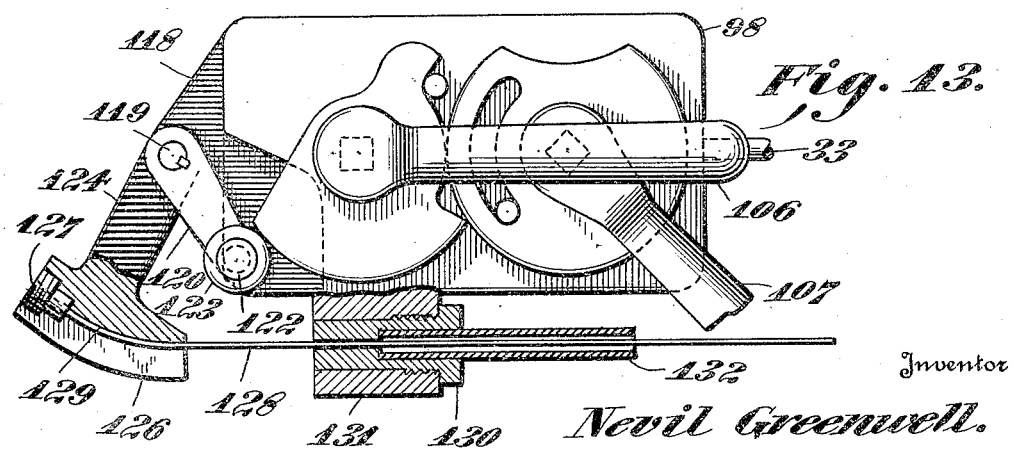

Figs. 11, 12 and 13 show a plan view with part section taken along the line 11—11 of Fig. 10 of the master control lever and the throttle control lever of the device shown in Fig. 9 in their different operating positions.

Fig. 14 illustrates diagrammatically in part another embodiment of my invention, when not in use, for a one-way auxiliary steam engine as mounted directly on the quadrant bracket of the locomotive reverse lever.

Fig. 15 is a part view of the device shown in Fig. 14 and is shown as with the auxiliary steam engine in use.

Figs. 16 and 17 are plan views in part section of the Figs. 14 and 15 respectively.

Fig. 18 illustrates diagrammatically one embodiment of my invention as applied to a two-way or reversing steam engine.

Figure 19:
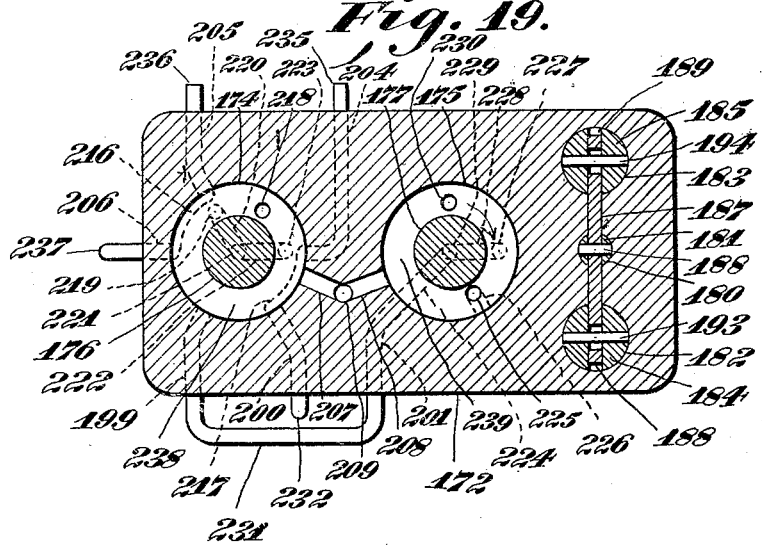

Fig. 19 is a diagrammatic section of the control valve body taken along the line 19—19 of Fig. 18.

Figure 20:
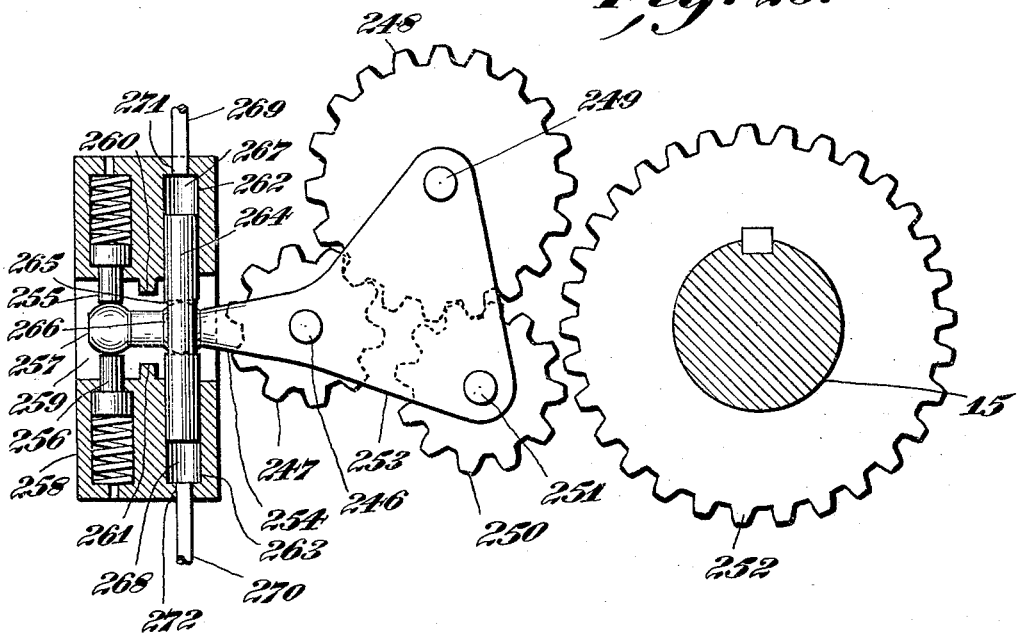

Fig. 20 illustrates diagrammatically the entrainment mechanism of a one-way auxiliary steam engine as arranged for two-way operation used in connection with my invention.

Figure 21:
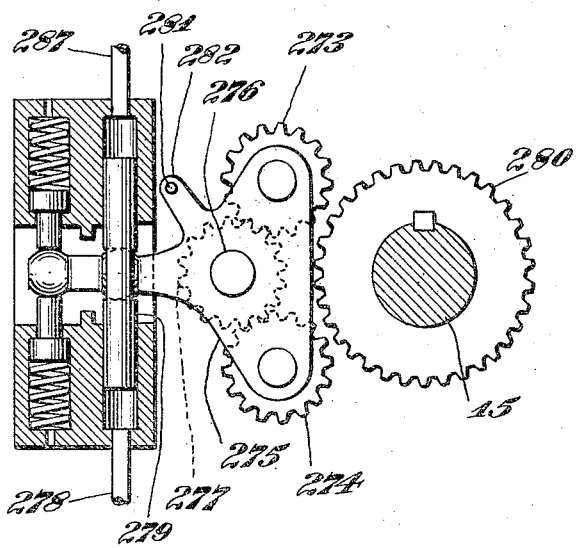

Fig. 21 illustrates diagrammatically the entrainment mechanism of a reversing auxiliary steam engine used in connection with my invention.

Figure 22:
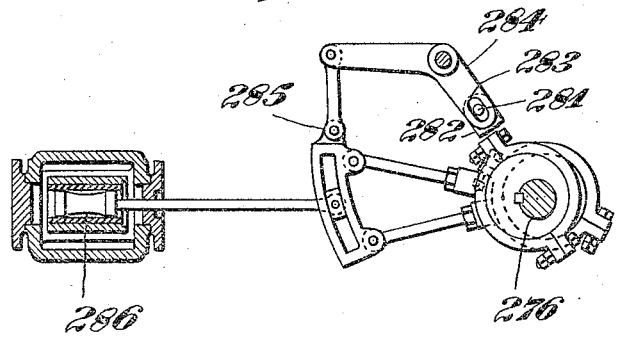

Fig. 22 illustrates diagrammatically a reversing mechanism of a reversing steam engine used in connection with my invention.

Fig. 23 shows a plan view of the master control lever and the throttle control lever of the device shown in Fig. 18 when in an operating condition.

Fig. 24 is a sectional view taken along the line 24—24 of Fig. 18.

Fig. 25 is a sectional view taken along the line 25—25 of Fig. 18, and with the control mechanism in an inoperative condition, and Fig. 26 is a sectional view taken along the same line as Fig. 25, when the control mechanism is in an operating condition.

Referring to the drawings more in detail, wherein I show my controlling mechanism used in connection with a main steam locomotive and its auxiliary steam locomotive, 10 designates a steam locomotive having a boiler 11 of usual construction for generating steam and a tender 12 coupled thereto. An auxiliary steam engine 13 is suspended intermediate the axles 14 and 15 of the tender truck 16 and is adapted to be operatively connected to the axle 15 of the said truck through suitable gearing when the auxiliary steam engine 13 is turned over upon the admission of steam to its cylinders 17, in a manner similar to that disclosed in Letters Patent 1,710,354 granted to R. S. A. Dougherty, et al., under date of Apr. 23, 1929. It being understood that my invention is not limited to the use of such an entrainment mechanism which is only given by way of illustration.

Pipes 18, 19 and 20 are provided for conveying steam to the auxiliary steam engine 13. The pipe 19 is connected to the superheated steam pipe 21 intermediate of the main throttle valve 22 and the cylinders 23 of the main locomotive. A throttle valve 24 is disposed in the pipe line 18 for controlling the steam supply to the cylinders 17. The pipe 20 leads from the saturated steam dome 25 to the inlet side of the throttle 24 and supplies saturated steam to the cylinders 17 when the superheated steam supply is shut off from the pipe 19 by reason of the functioning of the main locomotive throttle 22. A check valve 26 in the pipe line 19 acts to permit superheated steam to flow to the auxiliary engine throttle 24, and to prevent saturated steam from flowing back through the pipe 19. Shut off valve 27 in the pipe line 19 and shut off valve 27' in the pipe line 20 are provided to shut off all operative steam from the cylinders 17 when the auxiliary steam locomotive is not to be used.

In the main locomotive cab are located the main locomotive throttle lever 28, the main locomotive reverse lever 29, the auxiliary locomotive master control mechanism 30 and the interlock mechanism 31. A reach rod 32 connects the main locomotive throttle lever 28 to the main locomotive throttle 22. A pipe 33 connects the auxiliary locomotive master control mechanism 30 to the main air reservoir (not shown) of the locomotive. In the pipe line 33 is provided a shut-off valve 34.

Referring to Figs. 2, 3, 4, 5, 6, 7 and 8, the auxiliary locomotive master control mechanism 30 comprises a casing 35 having cylindrical openings or bores 36, 37 and 38 formed therein for receiving the valve discs or plugs 39 and 40, and the locking plunger 41, respectively. A casing plate 42 is attached to the casing 35 by any suitable means. The casing 35 is provided with the ducts 43, 44 and 45. The casing plate 42 is provided with the ducts 46, 47, 48, 49 and 50. The valve plug 39 is provided with the ducts 51 and 52. The valve plug 40 is provided with the ducts 53 and 54. The ducts 44, 43 and 46 connect the annular chambers 55 and 56 with the pipe 33. The duct 45 connects the annular chamber 57 with the pipe 58. The ducts 47, 48, 49 and 50 connect with the pipes 59, 60, 61 and 62, respectively. The ducts 51 and 53, under certain conditions to be hereinafter described, communicate the pipes 60 and 62 to the atmosphere through pipes 59 and 61, respectively; while the ducts 52 and 54, under certain other conditions to be hereinafter described, communicate the pipes 60 and 62 with the annular chambers 55 and 56, respectively. The valve plugs 39 and 40 are operatively connected to the handles 63 and 64 respectively. The handle 63 has a segmental shaped flange 65 with stop edges 66 and 67 and a convex circular edge 68. The handle 64 has an irregular shaped flange 69 with one concave circular edge 70 suitable for engagement with the convex circular edge 68 of the flange 65, and one other convex circular edge 71.

The rotational movement of the handle 63 is limited by the stops 72 and 73 which engage, under certain conditions to be hereinafter described, the edges 67 and 66 respectively. The rotational movement of the handle 64 is limited by the stop 74 which engages, under certain conditions to be hereinafter described, the end walls of the slot 75. For preventing rotational movement, the handle 64 is provided with a recess 76 which receives, under certain conditions to be hereinafter described, the upper extremity of the locking plunger 41. The locking plunger 41 is constrained to act upwardly by means of a spring 77.

The pipes 58 and 60 connect the master control mechanism 30 to the interlock mechanism 31. The interlock mechanism 31 comprises a casing 78 mounted on the reverse lever bracket 79, an interlock lever 80 pivotally mounted on the reverse lever bracket 79, and a stop member 81 mounted on the reverse lever 29. The casing 78 has a cylindrical opening or bore 82 formed therein for receiving the interlock plunger 83. The interlock plunger 83 has a shoulder 84 which limits its upward movement by engaging a threaded plug 85 mounted in the upper part of the casing 78. The threaded plug 85 also acts as a guide for the interlock plunger 83 and as an abutting surface for the spring 86. The spring 86 acts to constrain the interlock plunger 83 in a downward direction. A cylindrical end 87 on the interlock lever 80 engages in a slot in the upper end of the interlock plunger 83. The casing 78 has three ducts 88′, 88 and 89, communicating with its cylindrical bore 82. The duct 88′ connects the pipe 58 to the bore 82 at a point distant from its lower end. The duct 88 connects the bottom of the bore 82 to the pipe 60. The duct 89 connects the upper portion of the bore 82 to the atmosphere by means of the pipe 90.

The pipe 62 connects the master control mechanism 30 to the auxiliary throttle 24. The auxiliary throttle 24 may be of any well known type operable by a fluid motor 91.

The operation of my invention is as follows:

Assuming that the auxiliary steam engine 13 is in an inoperative condition but ready for use when desired; the shut-off valves 27 and 27′ will be open allowing steam under pressure to flow through the pipes 19 and 20 to the inlet side of the closed auxiliary throttle 24, the shut-off valve 34 will be open to allow air under pressure to flow through the pipe 33, the ducts 43 and 44, to the chambers 55 and 56, and the parts of the master control mechanism 30 together with those of the interlock mechanism 31 are in the relative positions shown in Figs. 2, 4, and 7. In this condition the engineer has free use of the reverse lever 29 to operate the main locomotive throughout its full range of operation without interference by any part of the auxiliary control mechanism or of the auxiliary steam engine 13.

The engineer now desiring to engage the auxiliary locomotive to help out the main locomotive rotates the master control handle 63 clockwise until the stop edge 66 of the flange 65 comes in contact with the stop 73 as shown in Fig. 5 when further clockwise rotation is prevented. This rotates the valve plug 39 causing the pipe 60 to be disconnected from the atmosphere and connects it to the chamber 55 through the duct 52 as shown in Figs. 3 and 8. Air under pressure then flows through the pipe 60 and duct 88 in the casing 78 and exerts pressure on the underside of the interlock plunger 83. This pressure is sufficient to overcome the weight exerted by the interlock plunger 83 and the reaction of the spring 86, and the plunger 83 tends to rise carrying with it the cylindrical end 87 of the lever 80.

The interlock lever 80 is so designed that if the engineer has the reverse lever 29 in the position corresponding to the direction in which it is desired to operate the auxiliary engine (which is in the forward direction in this specific case) the plunger 83 will rise until the shoulder 84 engages the underside of the threaded plug 85 and places the lever 80 in the position shown in Fig. 3. It will be seen that in the latter position the stop face 94 is placed in the path of the stop member 81, and thus limits the range of operation of the reverse lever 29 to the particular section of the quadrant. When the plunger 83 is in its raised position its lower end has passed over and uncovered the duct 88′ where it enters the bore 82, thereby allowing air under pressure to flow through the duct 88′ and through the pipe 58, and through the duct 45 of the casing 35 into the chamber 57. The effective air pressure on the plunger 41 acts to overcome the resistance of the spring 77 and withdraws the plunger 41 from its engagement with recess 76 in the flange 69 of the handle 64. With the plunger 41 and the lever 80 in the positions shown in Fig. 3 the engineer is limited in his use of the main locomotive reverse lever to positions that correspond to forward operation of the locomotive (here shown on the left half of the reverse lever quadrant). The operator may now make use of the auxiliary engine by rotating the throttle handle 64 clockwise until prevented by the stop 74 as shown in Fig. 6. This rotation of the throttle handle 64 results in the rotation of the valve plug 40 which in turn results in the pipe 62 being disconnected from the atmosphere and in becoming connected to the chamber 56 through the duct 54 as shown in Figs. 3 and 8. Air under pressure from the chamber 56 then flows through the pipe 62 to the air motor 91 of the auxiliary throttle 24, opening the throttle and allowing steam under pressure to flow to the cylinders 17 of the auxiliary steam engine. Thereupon the latter is automatically entrained with the locomotive in the manner set forth in the Letters Patent aforementioned. When the engineer desires to discontinue the use of the auxiliary locomotive he first rotates the throttle handle 64 anti-clockwise until prevented by the stop 74 and the handle 64 is then in the position shown in Figs. 4 and 5. He then rotates the master control handle 63 anti-clockwise until prevented by the edge 67 engaging the stop 72 to the position shown in Fig. 4. The movement of the throttle handle 64 from the position shown in Fig. 6 to that shown in Figs. 4 and 5, disconnects the pipe 62 from the air under pressure in chamber 56 and connects the pipe 62 to the atmosphere allowing the air under pressure within the motor 91 to escape. This results in the closing of the auxiliary throttle 24 to shut off the motive power to the auxiliary locomotive. At the same time the recess 76 becomes positioned over the top of the locking plunger 41. In moving the master control handle 63 from the position shown in Fig. 6 to that shown in Fig. 4, the engineer disconnects the pipe 60 from the air under pressure in chamber 55 and connects the pipe 60 to the atmosphere, allowing the air under pressure within the pipe 60, bore 82, duct 88′, pipe 58, and chamber 57 to escape. This permits the locking plunger 41 to rise under the action of the spring 77 thereby locking the handle 64 in its inoperative position, and permits the plunger 83 to return to its original position under the action of the spring 86 as shown in Fig. 2. The stop face 94 is withdrawn from the path of the stop member 81 and reverse lever is free to be moved to any position across the quadrant. It should be noted that when exhausting the air from the pipe 58 the air first escapes back through the pipe 60 until the piston head 93 of the interlock plunger 83 passes down over the inner port of the duct 88′ then the remaining air under pressure in the pipe 58 may escape to the atmosphere through the pipe 90.

My invention provides for several safeguards that prevent improper functioning of the auxiliary locomotive. In the procedure described above it was assumed that the entrainment and disentrainment of the auxiliary locomotive was properly done. Should the engineer through carelessness, or otherwise, after having properly opened the master control lever, attempt to move the locomotive reverse lever from its forward position to a reverse position he would find the way blocked by reason of the stop member 81 coming in contact with the face 94 of the interlock lever 80, as shown in Fig. 3. He is thus limited to proper manipulation of his locomotive reverse lever 29 in a forward direction only as long as the master control handle 63 is in its operative position shown in Fig. 2. If he wishes to reverse his main locomotive after having opened the master control handle 63 he must first return the master control lever to its inoperative position. Should the engineer, having his main locomotive reverse lever in its reverse position attempt to engage the auxiliary locomotive he will find it impossible to do so, since, though he may open the master control handle 63, the interlock lever 80 and in turn the plunger 83 cannot rise, as the face 95 of the lever 80 will contact with the face 96 of the stop member 81 thus preventing the duct 88′ from being uncovered by the piston head 93 of the plunger 83 and thereby making it impossible to unlock the throttle lever 64, and unless the throttle lever 64 is unlocked the throttle 24 cannot be opened. Also, should the engineer attempt to open the throttle handle 64 before having opened the master control handle 63 he finds the way again blocked. By reason of the convex and concave engagement of the edges 68 and 70 of the handles 63 and 64, respectively, the handle 64 cannot be rotated clockwise to open until the handle 63 has been rotated clockwise to its position against the stop 73. In this position the corner formed by the intersecting of the edges 67 and 68 on the handle 63 will just clear the periphery of the edge 71 of the handle 64, and the latter may then be opened. Again, should the engineer, having properly operated the auxiliary locomotive, attempt to close the master control lever without first shutting off the auxiliary throttle, he will find his effort blocked by reason of the fact that the corner formed by the intersecting edges 67 and 68 on the handle 63 is in contact with the periphery of the convex edge 71 on the handle 64. Before the handle 63 can be closed the handle 64 must be in its fully closed position as shown in Fig. 5, at which point the center of radius of the convex edge 68 of the handle 63 is coincident with the center of radius of the concave edge 70 of the handle 64.

It will be easily seen that by extending the stop member 81 transversely from the reverse lever 29 toward the face 94 or by moving said face further along the lever 80 toward the section of the quadrant in which said lever operates during auxiliary operation or by changing the position of both stop faces, I am able to further limit the range of operation of the reverse lever during the auxiliary operation. By such simple change the locomotive can be positively restricted to low speed operation while the auxiliary is in a condition for operation.

My invention is not limited to the use of a fluid under pressure to perform the automatic features of operation. In Figs. 9, 10, 11, 12 and 13 I show a modification of my invention in which I use well known mechanical means to connect the master control lever to the interlock mechanism. As shown in Figs. 9 to 13 inclusive the locomotive reverse lever 29 and the bracket 79, the pipes 33, 61 and 62, and the throttle valve 24 with the fluid motor 91 are the same as used in the fluid operated device. The master control mechanism 97 comprises a casing 98 having cylindrical openings or bores 99 and 100 formed therein for receiving the spindle 101 and the valve disc or plug 102, respectively. A casing plate 103 is attached to the casing 98 by any suitable means. The casing 98 is provided with a duct 104 which connects the annular chamber 105 with the pipe 33. The valve plug 102 has ducts identical in function and operation to the ducts 53 and 54 shown in Figs. 7 and 8 for the valve plug 40. The casing plate 103 has ducts for the pipes 61 and 62 identical in function and operation to the ducts 49 and 50 shown in Fig. 2. The spindle 101 and the valve plug 102 are operatively connected to the handles 106 and 107, respectively. The handle 106 has a circular shaped flange 108 having a cut out portion with stop edges 109 and 110 which limits the rotational movement of the handle 106 by engagement with the stop pin 111 mounted in the casing 98, a cut out portion with the cam edge 112, and the convex circular cam and stop edge 113, the latter being concentric with the axis of rotation of the handle 106. The handle 107 has a circular shaped flange 114 with a concave circular edge 115 complementary to the convex circular edge 113 of the handle 106. A circular slot 116 concentric with the axis of rotation of the handle 107 is provided in the flange 114 and serves to limit the rotational movement of the handle 107 by engagement with the pin 117 mounted on the casing 98. The casing 98 has an extension 118 in which is journalled the shaft 119. The lever 120 is secured to the upper end of the shaft 119 by any suitable means such as a key 121. Attached to the lever 120 is the shouldered pin 122 which rotatably mounts the roller 123. On the lower end of shaft 119 is secured the lever arm 124 by any suitable means such as the key 125. The outer end of the lever arm 124 is formed in an arc 126 and mounted therein are the plug 127 and a flexible wire 128. The plug 127 may be screwed or otherwise suitably mounted in place on the lever arm 124, and is secured to the end of the flexible wire 128 by any suitable means such as enlarging the end by riveting and then soldering or brazing. A circular seat 129 concentric with the axis of the shaft 119 forms a bearing for the flexible wire 128. The guide plug 130 is screwed or otherwise suitably mounted in an extension 131 to the casing 98 and maintains the wire 128 tangential with respect to the seat 129. Secured to the guide plug 130 by brazing or other suitable means is the flexible casing 132. The combination of the flexible wire 128 with the flexible casing 132 forms a mechanical device commonly known as the Bowden wire. The flexible casing 132 is usually formed of one or more coils of spring wire adapted to assume reasonable sharp turns, and, when the ends are fixed, it permits of considerable latitude of movement of the intervening portion without materially changing its length. By this means the flexible wire 128, being equally as flexible, is given the support of the surrounding flexible casing 132 and is constrained to follow the path assumed by the flexible casing 132. Under these conditions the flexible wire 128 may be pulled in either direction with practically no variations in the relative distance between its points of attachment.

The flexible wire 128 and the flexible casing 132 connect the master control mechanism 97 to the interlock mechanism 133. The interlock mechanism 133 comprises a casing 134 mounted on the reverse lever bracket 79, an interlock lever 135 pivotally mounted on the reverse lever bracket 79, and a stop member 136 mounted on the reverse lever 29. The casing 134 has a cylindrical opening or bore 137 formed therein for receiving the interlock plunger 138. The lower portion of the bore 137 is threaded to receive the plunger guide plug 139. The plunger guide plug 139 has a cylindrical opening or bore 140, the upper end of which serves as a guide for the lower end of the interlock plunger 138, while the lower end of the bore 140 is threaded to receive the guide plug 141. The guide plug 141 has a cylindrical bore 142, the upper portion of which acts as a guide for the flexible wire 128, while in the lower portion is fixed by soldering or brazing, or other suitable means, the other end of the flexible casing 132. A lock nut 143 is provided to lock the guide plug 141 to the plunger guide plug 139. The threaded engagement of the guide plug 141 in the plunger guide plug 139, together with the lock nut 143 permits of small compensating adjustment to be made for varying length between the flexible wire 128 and the flexible casing 132. The flexible wire 128 is attached to the interlock plunger 138 by forming a suitable head 144 on the flexible wire 128 and inserting the same in a T slot 145 in the interlock plunger 138, which permits of a relative movement about their axes between the flexible wire 128 and the interlock plunger 138.

A spring 146 co-acts with a shoulder on the inner end of the plunger guide plug 139 and a shoulder 147 on the interlock plunger 138 to constrain the latter in an upward direction until limited by a shoulder on the upper inner end of the bore 137. A cylindrical end 148 on the interlock lever 135 engages in a slot in the upper end of the interlock plunger 138.

The function and method of operating the handles of the above mechanical modification of my invention is practically identical to those of the fluid operated control mechanism first described, and the comparative similarity will be readily understood by anyone skilled in the art. For this reason it will be necessary only to point out the chief characteristic differences between the two control devices.

In the fluid operated mechanism as first described there is no positive connection between the master control handle and the interlock lever, and because of this it was necessary to provide the safety feature of the lever locking plunger 76 locking the handle 64 until the interlock lever 80 was in its proper operating position. However, with the flexible wire, of the mechanical device type of control, being directly attached to the interlock lever 135 the use of the locking plunger 76 becomes unnecessary, since, if the locomotive is being operated in a reverse direction as indicated by the reverse lever 29 being in the position shown in dotted lines in Fig. 9, then any movement of the handle 106 becomes impossible and this in turn prevents movement of the throttle handle 107. The reason for this will now be explained.

When the engineer attempts to operate the master control handle 106 by rotating it clockwise he brings the cam edge 112 of the handle flange into engagement with the roller and clockwise rotation of the levers 120 and 124 follows upon continued rotation of the handle 106. When the lever arm 124 moves clockwise the flexible wire 128 by reason of its attachment to the plug 127 is pulled to the right and the movement is transmitted to the other end of the wire attached to the interlock plunger 138 pulling the latter downward together with the interlock lever 135. This takes place on the assumption that the reverse lever is in its proper forward position. Should the engineer attempt to rotate the control handle 106 when the reverse lever is in its reverse position as shown in dotted lines in Fig. 9 then movement of the master control handle 106 is stopped at once by reason of the engagement of the edge 149 on the interlock lever 135 with the edge 150 of the stop member 136.

Where its installation permits and distant control is not essential I have devised another modification of my invention in simple form and which I show in Figs. 14, 15, 16 and 17. This modification performs its function and has the same safeguards practically identical to the fluid operated and the mechanical operated devices heretofore described. For this reason it will be unnecessary to further repeat these features as they will be apparent to anyone skilled in the art. The reverse lever 29 and its bracket 79, together with the pipes 33, 61 and 62 are assumed to be the same as in the devices previously described. The pipe 62 is connected as heretofore described but the throttle 24 with its fluid motor 91 is not shown. Furthermore the valve plug 151 mounted in the casing 152 corresponds in function, operation, and in its pipe connections, to the valve plug 40 shown in Figs. 2, 3, 7 and 8. As shown in Figs. 14 to 17 inclusive I have reduced the necessary number of parts required considerably in placing the master control handle 153 directly on the interlock lever 154 by eliminating the previously described operating mediums for functioning the interlock lever 154, and which results also in having the throttle control lever 155 interlock directly with the interlock lever 154.

As shown in Figs. 14 and 15 a casing 152 is mounted on the reverse lever bracket 79. The casing 152 has a cylindrical opening or bore formed therein for receiving the valve plug 151, and is further provided with a slot 156 which gives guiding engagement to the interlock lever 154. The valve plug is operatively connected to the throttle control handle 155. The throttle control handle 155 has a circular flange 157 cut out to form stop faces 158 and 159 which engage the pin 160 mounted on the casing 152 to limit the rotational movement of the throttle control lever 155, and is further provided with a slot or notch 161 which in the inoperative position of the control device as shown in Fig. 14 engages the end of the interlock lever 154. The interlock lever 154 is pivotally mounted on the reverse lever bracket 79. The master control handle 153 attached to the interlock lever 154 has formed therein a bore 162 to receive a detent plunger 163 and a spring 164. The spring 164 reacts between the closed end of the bore 162 and the inner end of the detent plunger 163 to constrain the detent plunger in an outward direction against the reverse lever bracket 79. The outer end of the detent plunger is slightly conical, the point of which engages the small recesses 165 and 166 in the reverse lever bracket 79 in such a way that sufficient resistance is offered against disengagement as to aid in holding the interlock lever 154 in the position determined by which of the small recesses 165 and 166 the detent plunger is engaged. The interlock lever 154 is provided with a slot or notch 167 which in the operating position of the control device as shown in Fig. 15 engages the flange 157 of the handle 155. A latch member 168 is mounted on the reverse lever 29 and functions in the same manner as described for the latch member 81 in Fig. 2.

It will be apparent to anyone skilled in the art that I have provided in the device shown in Figs. 14 to 16 inclusive a control mechanism to perform all the functions with all the safeguards that are described above with reference to the control mechanism shown in Figs. 2 to 8 inclusive, and this modification is very useful and economical when the arrangement of the reverse lever in the engineer's cab permits of its being installed with the master control handle 153 and the throttle control handle 155 in convenient reach of the engineer.

The control mechanisms shown in the Figs. 2 to 17 inclusive and heretofore described are for one-way operation of the auxiliary locomotive in a forward direction. It will be apparent to anyone skilled in the art that the same control mechanisms could be applied to an auxiliary locomotive that operated in a reverse direction. In the case of auxiliary locomotives that operate at will in either direction, commonly known as two-way or reversible auxiliary locomotives, it is not sufficient merely to apply two sets of control mechanisms that will function for either direction. In Figs. 18 to 26 inclusive I have shown a modification of my invention adapted to a two-way or reversible auxiliary locomotive, that is, one which is adapted to assist the locomotive in either forward or backward operation, and I will now proceed to describe the same.

My control mechanism as designed for a two-way or reversible auxiliary locomotive is shown in Figs. 18 to 26 inclusive. A master control mechanism 169 is mounted in some convenient part of the locomotive cab, and there is provided an interlock mechanism 170 for forward propulsion and an interlock mechanism 171 for reverse or rearward propulsion, both mounted on the locomotive reverse lever bracket 79. The auxiliary throttle 24 with its fluid operating motor 91 is identical to that shown in Fig. 2, and the auxiliary locomotive reversing mechanism may be of the type shown in Fig. 20 or of that shown in Figs. 21 and 22.

Referring to Figs. 18, 19, 23, 24, 25 and 26, the reversible auxiliary locomotive master control mechanism comprises the casing 172 to which is suitably attached the casing plate 173. The casing 172 has the cylindrical openings or bores 174 and 175 formed therein to receive the valve plugs 176 and 177 which are operatively connected to the master control handle 178 and the throttle control handle 179, respectively. Furthermore the casing 172 has formed therein the bore 180 (Fig. 19) for the locking plunger 181, and the bores 182 and 183 for the locking plunger pistons 184 and 185. The bore 180 is communicated at its lower portion with the bores 182 and 183 by means of a slot 186 which acts as a guide for the link 187 connecting the locking plunger 181 to the locking plunger pistons 184 and 185. The plunger 181 is slotted at its lower end to receive the link 187 to which it is pivotally attached by means of the pin 188. The pistons 184 and 185 have formed therein slotted recesses 189 and 190, respectively, to receive the ends of the link 187, which, by means of the elongated slots 191 and 192 formed therein engaging the pins 193 and 194 mounted in the pistons 184 and 185, respectively, permits of relative limited transverse and rotational movement between the link 187 and the pistons 184 and 185. The springs 195 and 196 are placed under compression between the lower ends of the pistons 184 and 185 and the bottom of the bores 197 and 198, respectively, in the casing plate 173, and tend to constrain simultaneously both pistons in an upward direction.

The casing 172 is provided with the ducts 199, 200, 201, 202, 203, 204, 205, 206, 207, 208, 209, 219, 221, 223, 227 and 229. The casing plate 173 is provided with the ducts 210 to 215 inclusive. The master control valve plug 176 is provided with the ducts 216, 217, 218, 220, and 222, while the throttle control valve plug 177 is provided with the ducts 224, 225, 226, 228 and 230. The duct 199 is connected to the duct 201 by means of the pipe 231. The duct 200 is connected to the pipe 232. The ducts 202 and 203 are connected to the pipes 233 and 234 and communicate with the annular chambers 244 and 245 respectively. The ducts 204, 205 and 206 are connected to the pipes 235, 236 and 237 respectively. The annular chambers 238 and 239 formed by the valve plugs 176 and 177 within the bores 174 and 175 respectively are communicated one with the other and with the duct 213 by means of the ducts 207, 208 and 209. The ducts 210, 211, 212, 213, 214 and 215 are connected to the pipes 240, 241, 242, 33, 243 and 62, respectively.

The ducts 216, 217, 218, 220 and 222, due to the operation of the master control handle 178, may each assume three different positions, as follows: When the master control handle 178 is closed, as is indicated in Fig. 19, then the duct 216 communicates the duct 205 with the duct 206; the duct 217 communicates the duct 200 with the duct 204; the duct 218 communicates only with the annular chamber 238; the duct 220 communicates the duct 219 with the duct 221; and the duct 222 communicates the duct 223 with the duct 221. When the master control handle 178 is turned counter-clockwise to the position indicated in full lines in Fig. 23, then the duct 216 communicates the duct 206 with the duct 199; the duct 217 communicates only with the duct 204; the duct 218 communicates the annular chamber 238 with the duct 219; the duct 220 communicates only with the duct 221; and the duct 222 communicates only with the duct 221. When the master control handle 178 is turned clockwise to the position indicated by the dotted lines in Fig. 23, then the duct 216 communicates only with the duct 205; the duct 217 communicates the duct 199 with the duct 200; the duct 218 communicates the annular chamber 238 with the duct 223; the duct 220 communicates only with the duct 221; and the duct 222 communicates only with the duct 221.

The duct 221 communicates at all times with the ducts 220 and 222. The duct 229 communicates at all times with the ducts 224 and 228. The duct 225 communicates directly with the duct 226. The ducts 219, 221, 223, 209, 229 and 227, in the casing 172 are positioned respectively over the ducts 210, 211, 212, 213, 214, and 215 in the casing plate 173, and are therefore at all times in respective communication therewith.

The ducts 224, 226, 228 and 230, due to the operation of the throttle control handle 179, may each assume two different positions, as follows: When the throttle control handle 179 is closed as is indicated in Fig. 19, then the duct 224 communicates the duct 201 with the duct 229; the duct 226 communicates only with the annular chamber 239 through the duct 225; the duct 228 communicates the duct 227 with the duct 229; and the duct 230 communicates only with the annular chamber 239. And when the throttle control handle 179 is open as is indicated in Fig. 23, then the duct 224 communicates only with the duct 229; the duct 226 communicates the annular chamber 239 through the duct 225 with the duct 201; the duct 228 communicates only with the duct 229; and the duct 230 communicates the annular chamber 239 with the duct 227.

Figure 1:
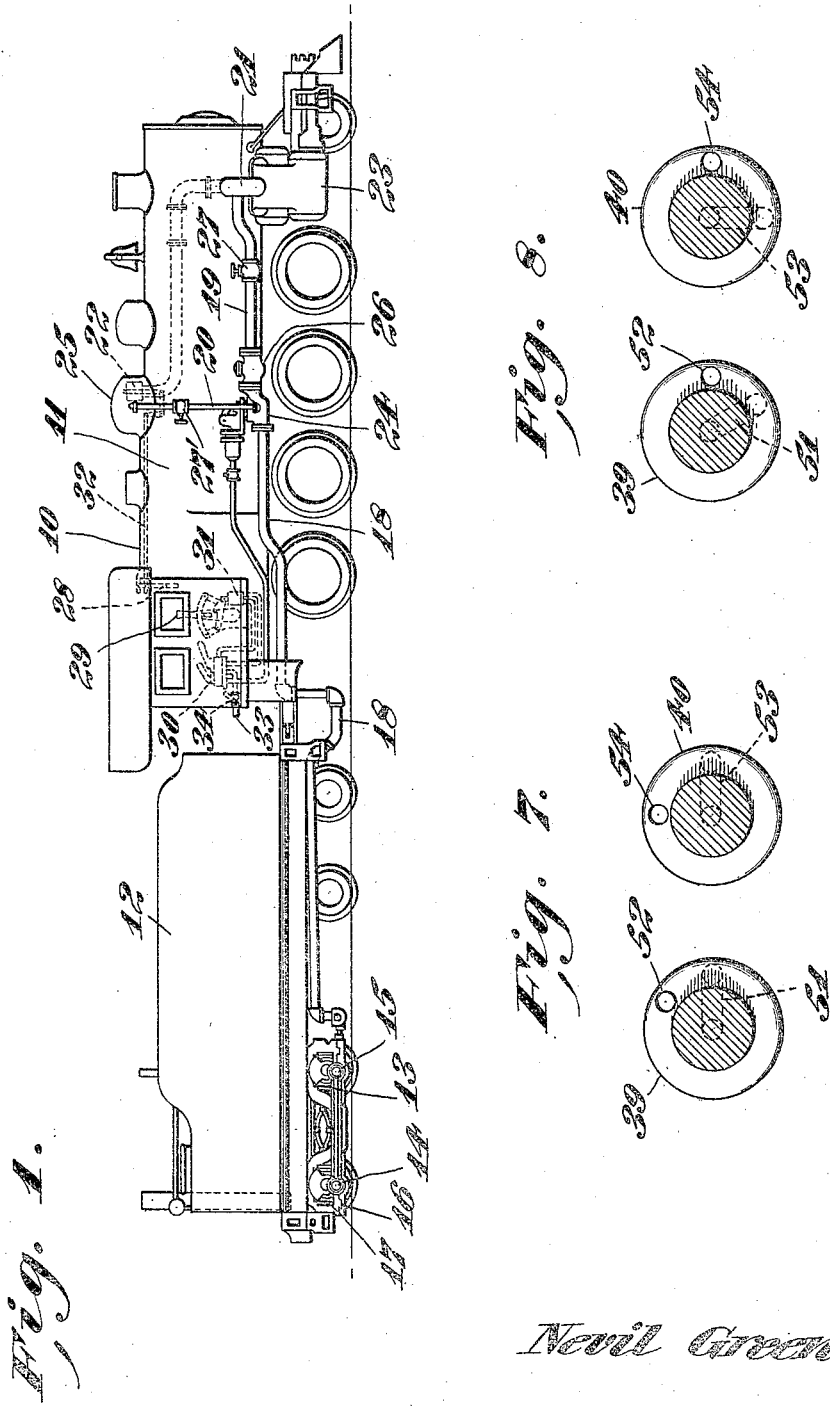
Fig. 1 illustrates diagrammatically a steam locomotive embodying my invention.

In Fig. 20 I show diagrammatically the reversing mechanism of one type of a reversing auxiliary locomotive adapted for use with my control mechanism. In this type of reversing auxiliary locomotive the steam cylinders 17 (Fig. 1) operate the engine crank 246 of the auxiliary engine 13 in one direction only, and reversing is effected by a train of gears which may be so entrained as to drive the axle 15 of the auxiliary locomotive in the desired direction. The reversing mechanism comprises an engine shaft gear 247, fixed upon the engine shaft 246, which engages at all times the forward idler gear 248 rotatably mounted upon a shaft 249. The forward idler gear 248 engages at all times a reverse idler gear 250 rotatably mounted upon a shaft 251. An axle gear 252 is fixed upon the axle 15. The shafts 249 and 251 are mounted in a fixed position in a bracket 253, which is rotatably mounted upon the engine shaft 246 and is yieldingly held in a neutral position in which neither of the idler gears 248 and 250 are in engagement with the axle gear 252. This yieldingly positioning of the bracket 253 is accomplished by engaging an extension arm 254 of the bracket 253 between two opposed spring pressed plungers 255 and 256, slidably mounted in the casing 258, which are spaced, when in a constrained position of rest, with their opposed ends apart a distance equal to the diameter of the cylindrically shaped end 257 of the arm 254. The opposed ends of the plungers 255 and 256 together with the extension arm 254 extend into a central opening 259 in the casing 258. The bracket 253 may be rotated clockwise by overcoming the resistance offered to movement along its axis of the spring pressed plunger 255, and the bracket 253 may be rotated counterclockwise by overcoming the resistance offered by the spring pressed plunger 256. The faces 260 and 261 within the opening 259 of the casing 258 act as stops to limit the rotational movement of the bracket 253. The casing 258 together with its attached parts is mounted as a unit to some stationary part of the auxiliary engine, such as its main bed frame (not shown). Formed within the casing 258 are the two opposed co-axial bores 262 and 263 in which is slidably mounted a single double headed plunger 264. At a midpoint between the heads of the plunger 264 a rectangular slotted hole 265 is formed therein, in which a portion 266 of the arm 254, provided with cylindrically shaped faces, has transversely slidable and rotatable engagement. The depths of the bores 262 and 263 are such that the plunger 264 may be moved axially in either direction an amount determined by the angular movement of the bracket 253. The heads of the plunger 264 together with the inner ends of the bores 262 and 263 form the chambers 267 and 268 to which the pipes 269 and 270 are communicated by means of the ducts 271 and 272. By means of the pipes 269 and 270 a fluid under pressure may be brought to exert its force against either end of the plunger 264 as desired.

The engine shaft 246 together with the gear 247 always rotates in a clockwise direction, which, by reason of their constant engagement, causes the idler gear 248 to rotate in a counter-clockwise direction and the idler gear 250 to rotate in a clockwise direction. If it is desired to engage the axle gear 216 so as to exert a driving force in a forward direction to the axle 15 it is only necessary to communicate the chamber 268 by means of the pipe 270 to a source of fluid pressure sufficient to move the plunger 264 against the resistance offered by the spring pressed plunger 255 and any weight component that may reside in the assembled unit of the bracket 253. Assuming this to have been done, and that the chamber 267 is under atmospheric pressure only, the plunger 264 is forced to move axially upward and by reason of its engagement with the arm 254 of the bracket 253 causes the latter to rotate clockwise until stopped by the bracket arm 254 engaging the stop face 260 of the casing 258, at which time the idler gear 248 will be fully enmeshed or entrained with the gear 252 and will exert upon the latter a clockwise rotational force. If it is desired to reverse the effect of the driving force on the axle 15 then the chamber 268 is put under atmospheric pressure and the chamber 267 is communicated with a source of fluid pressure sufficient to move the plunger 264 against the resistance offered by the spring pressed plunger 256 and any weight component that may reside in the assembled unit of the bracket 253. When this is done the plunger 264 moving axially downward causes the bracket 253 to rotate counter-clockwise until the arm 254 engages the stop face 261, in which position the idler gear 250 will have become fully enmeshed or entrained with the axle gear 252 and will be exerting a counter-clockwise rotational force on the axle gear 252.

In Figs. 21 and 22 I show diagrammatically another type of reversing mechanism for a reversing auxiliary locomotive. In this type of reversing auxiliary locomotive the auxiliary steam engine 13 itself is reversed corresponding to the direction of use of the main locomotive while at the same time the driving gear mechanism is entrained for the corresponding direction. The gear entraining mechanism is shown in Fig. 21 and is broadly similar to that shown in Fig. 20 in that the idler gears 273 and 274 are mounted in a bracket 275 which is rotatably mounted on the engine shaft 276. The bracket 275 is rotated about the engine shaft 276 in the same manner and by the same type of mechanism as is shown in Fig. 20. The idler gears 273 and 274 are each in constant engagement with the engine shaft gear 277. When it is desired to drive the auxiliary locomotive in a forward direction a fluid under pressure is admitted to the pipe 278 which actuates the plunger 279 to rotate the bracket 275 in a clockwise direction and enmeshes the idler gear 273 with the axle gear 280, and at the same time by reason of the engagement of a pin 281 in an arm extension 282 of the bracket 275 with an elongated hole 283 in the crank arm 284 (Fig. 22) motion is transmitted to a valve reversing mechanism 285 (Fig. 22) which functions to set the steam valves 286 in the steam chest of the steam cylinders 17 so as to cause the engine shaft 276 to rotate in a clockwise direction. To drive the axle 15 in a reverse direction fluid under pressure is admitted to the pipe 287 which results in engaging the idler gear 274 with the axle gear 280 and at the same time in setting the engine valves 286 for rearward or counter-clockwise rotation of the engine shaft 276.

The design of the valve reversing mechanism 285 is similar to that of the well known Stephenson link reverse gear and need not herein be further described.

The functions of the control mechanism as shown in Figs. 18 to 26 inclusive for a reversible auxiliary locomotive are practically identical to those described for use in a forward direction only and shown in Figs. 2 to 8 inclusive, with the exception that provision is made for controlling the use of the auxiliary in either direction and for entraining the auxiliary in the corresponding direction. The master control handle 178 and the throttle control handle 179 correspond to the handles 63 and 64 of Fig. 2. When the auxiliary is not in use the handles 178 and 179 are in the same relative position as are the handles 63 and 64 as shown in Fig. 4. It should be noted that in Fig. 4 the stop 72 which limits counter-clockwise rotation of the master control handle 63 in its inoperative position has its equivalent in Fig. 23 in the stop 288, but that the latter is located differently, and the stop 288 functions to limit the handle 178 in its reversed operative position. For aiding in holding the master control handle 178 in its three different operating positions, a spring pressed detent or plunger 289 is provided with a conical tip on its outer end adapted to engage the small recesses 290, 291 and 292 in the master control handle 178. The plunger 289 is slidably mounted in a small bracket 294 suitably attached to the casing 172, and by means of the spring 293 the plunger 289 is constrained in an outward direction against the master control handle 178. When the master control handle 178 is in its reverse operative position (indicated in full lines in Fig. 23) the detent plunger 289 engages the recess 290; and when the master control handle 178 is in its neutral position (similar to that of handle 63 in Fig. 4) the detent plunger 289 engages the recess 291; and when the master control handle 178 is in its forward operating position (indicated in dotted lines in Fig. 23) the detent plunger 289 engages the recess 292.

When it is desired to make use of the reversible auxiliary locomotive, existing conditions may be assumed to be the same as heretofore described for the forward running auxiliary locomotive. That is to say, the pipe 33 is connected to a source of air under pressure, the pipes 19 and 20 leading to the auxiliary throttle valve 24 are connected to a source of steam under pressure, and the master control handle 178 and the throttle control handle 179 are in their neutral position corresponding to the positions of the master control handle 63 and the throttle control handle 64 as indicated in Fig. 4. The pipe 33 communicates with the annular chambers 238 and 239 (Fig. 19) by means of the duct 213 in the casing plate 173 and the ducts 209, 207 and 208 in the casing 172, thus putting the chambers 238 and 239 under fluid pressure. Also at this time the pipe 237 is communicated to the atmosphere by means of the ducts 206, 216, 205 and the pipe 236; the pipe 231 is communicated to the atmosphere by means of the ducts 201, 224, 229, 214 and the pipe 243; the pipe 232 is communicated to the atmosphere by means of the ducts 200, 217, 204 and the pipe 235; the pipe 240 is communicated to the atmosphere by means of the ducts 210, 219, 220, 221, 211, and the pipe 241; the pipe 242 is communicated to the atmosphere by means of the ducts 212, 223, 222, 221, 211, and the pipe 241; the pipe 62 is communicated to the atmosphere by means of the ducts 215, 227, 228, 229, 214, and and pipe 243; the pipe 233 is communicated to the atmosphere by means within the interlock mechanism 170 which are identical to those shown for the interlock mechanism 31 in Fig. 2; and the pipe 234 is communicated to the atmosphere by means within the interlock mechanism 171 which are identical to those shown for the interlock mechanism 31 in Fig. 2. The pipes 240 and 242 are communicated with the pipes 234 and 233, respectively, by means within the interlock mechanism 171 and 170 which are identical to those shown in Fig. 3 within the mechanism 31 for communicating the pipe 60 to the pipe 58.

To engage the reversible auxiliary locomotive in a forward direction, the master control handle 178 is rotated clockwise to the position indicated in dotted lines in Fig. 23, which results as follows: The duct 218 is positioned over the duct 223 and admits the air under pressure within the annular chamber 238 to flow through the ducts 218, 223 and 212, into the pipe 242, through which it flows to the interlock mechanism 170 and functions the latter in the same manner as heretofore described for the interlock mechanism 31, from whence the air flows into and through the pipe 233 to the annular chamber 244, where, overcoming the resistance offered by the plunger 184, the latter is moved axially downward, and by reason of the connecting link 187 the locking plunger 181 is withdrawn from engagement with the recess 295 in the throttle control handle 179 and the latter is free to be opened when desired; and the duct 217 is positioned so as to communicate the duct 199 with the duct 200. If the throttle control handle 179 is now rotated clockwise to the position indicated in Fig. 23 the following results: The duct 230 is positioned over the duct 227 and admits the air under pressure within the annular chamber 239 to flow through the ducts 230, 227, and 215, and into the pipe 62, through which it flows to function the auxiliary throttle 24 by means of the fluid motor 91; and the duct 226 is positioned to communicate with the duct 201 which permits the air under pressure within the annular chamber 239 to flow through the ducts 225, 226, 201, and into and through the pipe 231 into and through the ducts 199, 217, and 200, into and through the pipe 232 to either the pipe 270 or the pipe 278 (dependent upon whether the entraining device shown in Fig. 20 or in Fig. 21 is being used) which results in functioning the auxiliary locomotive for forward use as heretofore described for Figs. 20, 21, and 22. To discontinue the use of the auxiliary locomotive, the throttle control handle 179 is returned to its normal inoperative position which results in the shutting off of the supply of air under pressure to, and the placing under atmospheric pressure of the operating mechanisms of the auxiliary throttle and the entraining devices as heretofore described.

To engage the reversible auxiliary locomotive in a reverse direction, the master control handle 178 is rotated counter-clockwise to the position indicated in full lines in Fig. 23, which results as follows: The duct 218 is positioned over the duct 219 and admits the air under pressure within the annular chamber 238 to flow through the ducts 218, 219, and 210, into the pipe 240, through which it flows to the interlock mechanism 171 and functions the latter in the same manner as heretofore described for the interlock mechanism 31, from whence the air flows into and through the pipe 234 to the annular chamber 245, where, overcoming the resistance offered by the plunger 185, the latter is moved axially downward to the position shown in Fig. 26, and by reason of the connecting link 187 the locking plunger 181 is withdrawn from engagement with the recess 295 in the throttle control handle 179, and the latter is free to be opened when desired; and the duct 216 is positioned so as to communicate the duct 199 with the duct 206. If the throttle control handle 179 is now rotated clockwise to the position indicated in Fig. 23 the following results: The duct 230 is positioned over the duct 227 and admits air under pressure within the annular chamber 239 to flow through the ducts 230, 227, and 215, and into the pipe 62, through which it flows to function the auxiliary throttle 24 by means of the fluid motor 91; and the duct 226 is positioned to communicate with the duct 201 which permits the air under pressure within the annular chamber 239 to flow through the ducts 225, 226, and 201, and into and through the pipe 231, into and through the ducts 199, 216, and 206, into and through the pipe 237 to either the pipe 269 or 287 (dependent upon whether the entraining device shown in Fig. 20 or in Fig. 21 is being used) which results in functioning the auxiliary locomotive for reverse use as heretofore described for Figs. 20, 21, and 22. To discontinue the use of the auxiliary locomotive, the throttle control handle 179 is returned to its normal inoperative position which results in the shutting off of the supply of air under pressure to, and the placing under atmospheric pressure of, the operating mechanisms of the auxiliary throttle and the entraining devices as heretofore described.

It will be apparent from the preceding description when the interlock mechanism 170 is functioned and the interlock lever 296 is thereby brought into its operating position the same safeguards and limitation of operations prevails for the use of the auxiliary locomotive as are effective for the control mechanism as described for Figs. 2 and 3. Furthermore, when the interlock mechanism 171 together with its interlock lever 297 is functioned, the same safeguards and limitations of operations are effective.

The shut-off valves 298 and 299 are provided in the pipe lines 232 and 237, respectively, for use when it is desired to run the auxiliary engine 13, without entraining it with the axle 15, for the purpose of testing or inspection. This is done by closing the shut-off valves 298 and 299, whereby air under pressure is prevented from going to the entraining devices, and the auxiliary engine may then be operated, without engaging the axle 15, by the proper manipulation of the control mechanism heretofore described.

While for the purpose of illustrating the adaptation of a device embodying my invention to a reversible auxiliary I have described and shown a fluid actuated mechanism. It can easily be seen that the mechanical interlock means shown in Figs. 9, 10, 11, 12 and 13 can be adapted to a reversible auxiliary in place of the fluid actuated interlock mechanism. In the mechanical adaptation there is provided an additional interlock mechanism which is similar, though of opposite hand, to that shown in Fig. 11. There is also provided on the master lever an additional cam face, similar to cam face 112 though of opposite hand, to operate the added interlock mechanism. It is of course understood that the master lever for the mechanical device has the same neutral and operating positions as the master lever 178 shown in Fig. 23, which is necessary to determine the direction of operation of the auxiliary. Thus, assuming that the locomotive reverse lever is set for forward operation, when the master lever is set for forward operation, it actuates the interlock for restricting the reverse lever to such operation and said master lever moves freely with respect to the opposite hand interlock; conversely the latter interlock is actuated independently of its companion when the master lever is moved to its position for the reverse operation of the engine. Furthermore, the control for determining the direction of operation of the auxiliary, which is governed by the master lever, is similar to that described and shown in connection with the fluid operated reversing mechanism aforementioned.

From the foregoing description it will be seen that I have devised a master control mechanism which is novel in construction and prevents the inadvertent use of the auxiliary engine when the locomotive is in a condition for normal full range operation. Furthermore said control assures that certain positive acts on the part of the engineer be performed to render the auxiliary inoperative before the locomotive can be operative over its full range of operation.

While I have shown my invention in a plurality of forms it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. In a propulsion system, a main engine, an auxiliary engine, control means for said main engine, operating means for said auxiliary engine, means normally preventing the operation of said last mentioned means, and means for limiting the operation of said control means and for rendering said preventive means inoperative.

2. In a propulsion system, a main engine, an auxiliary engine, means to set the main engine for forward or backward operation, operating means for said auxiliary engine, means normally preventing the operation of said last mentioned means, and means for limiting the first mentioned means to one of its said operations and for rendering said preventive means inoperative.

3. In a propulsion system, a main engine, an auxiliary engine, a control means for said main engine, a control means for said auxiliary engine independent of the first mentioned means, and a master control means for controlling the operation of the two first mentioned control means.

4. In a propulsion system, a main engine, an auxiliary engine adapted to be operatively connected to or disconnected from the main engine, means to control the direction of operation of the main engine, control means for the operation of the auxiliary engine, and a master control operable to govern the latter control means when it is desired to operate the main engine independent of the auxiliary engine and govern the direction of the operation of the main engine when it is desired to operate the engines together.

5. In a propulsion system, a main engine, an auxiliary engine, an operating means for the main engine, an operating means for said auxiliary engine independent of the first mentioned means, and means to control the operation of the second mentioned means adapted to govern the operation of the first mentioned means.

6. In a propulsion system, a main engine, an auxiliary engine, a control means for the main engine, a control means for the auxiliary engine, means for locking the latter means, means to render said locking means inoperative, and means operatively connected with the first mentioned control means to prevent said locking means from being rendered inoperative.

7. In a propulsion system, a main engine, a reversing means for the latter, an auxiliary engine, a throttle control for the latter, means adapted to be placed in the path of action of said first mentioned means, means to be placed in the path of action of said throttle control, and means operatively connecting the second mentioned means with the third mentioned means.

8. In a propulsion system, a main engine having a reversing member, an auxiliary engine having a throttle control member, a movable member adapted to be placed in the path of action of said reversing member, means to lock said throttle control member, and means to render said locking means inoperative the operation of which is dependent upon the position of said movable member.

9. In a propulsion system, a main engine having a reverse lever, an auxiliary engine having a throttle lever, a member adapted to be placed in the path of action of said reverse lever, a member adapted to be placed in the path of action of said reverse lever, a member adapted to be placed in the path of action of said throttle lever, and a master control means for operating said members.

10. In a propulsion system, a main engine having a reverse lever, an auxiliary engine having a control means independent of said reverse lever, and means to control said control means the operation of which is dependent of the position of the reverse lever.

11. In a propulsion system, a main engine having a reversing means, an auxiliary engine having a throttle control, locking means adapted to be moved into locking or unlocking arrangement with said throttle control, and means to prevent the movement of the locking means associated with said reversing means.

12. In a propulsion system, a main engine having a reversing means, an auxiliary engine having a control means, means to govern the operation for the latter means, means to govern the operation of said reversing means, and a flexible means operatively connecting the aforesaid governing means.

13. In a propulsion system, a main engine having a reversing means, an auxiliary engine having a control means, means to govern the operation for the latter means, means to govern the operation of said reversing means, and articulated means operatively connecting the aforesaid governing means.

14. In a propulsion system, a main engine, an auxiliary engine adapted to assist said main engine in forward and backward operation, means to reverse the operation of the main engine, means to reverse the operation of the auxiliary engine, control means for the latter engine, means to correlate the direction of operation of said engines, means to govern said control means, and means to render said governing means inoperative conditioned upon said correlating means.

15. In a propulsion system, a main engine having reversing means operative to change the direction of its operation, an auxiliary engine having a control means, an instrumentality to render said reversing means inoperative, and means governed by said instrumentality preventing the operation of said control means.

16. In a propulsion system, a main engine, an auxiliary engine, a reversing means for the main engine, a throttle control for the auxiliary engine, a stop means adapted to be placed in the path of action of the reversing means, a locking means for said throttle control, means operatively connecting said stop means and said locking means, and means depending upon the action of said stop means for rendering said locking member inoperative.

17. In combination, a main engine having a reversing means, an auxiliary engine having a control means, stop means adapted to be moved into the path of action of said reversing means, stop means normally in the path of action of said control means adapted to be moved from its effective position, and means to correlate said movements.

18. In combination, a main engine, an auxiliary engine for assisting the main engine, a control means for the main engine unrestricted in its operation when it is desired to operate the main engine independent of the auxiliary engine, and means operable to restrict the operation of said control means when it is desired to operate said engines together.

19. In combination, a main engine, an auxiliary engine for assisting the main engine, a control means for the main engine unrestricted in its operation when it is desired to operate the main engine independent of the auxiliary engine, means restricting the operation of said auxiliary engine, and means to remove said restricting means and operable to restrict the operation of said control means when it is desired to operate said engines together.

20. In combination, a main engine having a reversing means, an auxiliary engine having a throttle means, a stop member adapted to be moved into the path of action of said reversing means, a member locking said throttle means adapted to be moved into unlocked position, and a master means to move said members whereby the movement of one of said members is conditioned upon the movement of the other of said members.

21. In combination, a locomotive reversing mechanism, a control device for an auxiliary engine, means to limit the operation of said mechanism, means to govern said control means, and a master control means to actuate said limiting means and automatically render said governing means inoperative.

22. In combination, an engine reversing mechanism, an engine control mechanism, means to govern the operation of said reversing mechanism to limit the operation of the engine to either a forward or reverse direction at the election of the engineer, means operable to actuate said governing means, and an element of said control mechanism adapted to govern said operable means.

23. In combination, a locomotive reversing member, an auxiliary engine throttle control member, stop means for limiting the operation of said reversing member, locking means for engaging said control member, a member operable to actuate said stop means, means to release said locking means, and an element of said control member adapted to lock said operable member.

24. In a propulsion system, a main engine, an auxiliary engine, means for reversing the operation of said main engine, means for controlling the operation of said auxiliary engine, and a master control means operable to prevent the operation of the auxiliary engine when said reversing means is conditioned for full range of operation and restrict the range of operation of said reversing means when the auxiliary engine is in a condition for operation.

25. In a propulsion system, a main engine having a reversing means, an auxiliary engine having a throttle control, means to limit the operation of said reversing means, and means dependent upon the limiting means being in its operative position for operating said throttle control.

26. In a propulsion system, a main engine having a reversing means, an auxiliary engine having a throttle control, means adapted to limit said reversing means, means to prevent the operation of said throttle control, means to actuate said limiting means conditioned upon said reversing means, and means to render said preventive means inoperative conditioned upon said actuating means.

27. In combination, a main engine having a reversing member, an auxiliary engine having a throttle control member, a stop member adapted to coact with said reversing member to limit the range of action of the latter, a locking member adapted to coact with said throttle control member to prevent the operation of said auxiliary engine, means to actuate said stop member, means to actuate said locking member, and means to govern the operation of the aforesaid actuating means conditioned upon the operation of said throttle control member.

28. In combination, a main engine having a reversing means, an auxiliary engine having a throttle member, a stop means adapted to be placed in the line of action of said means, a member to prevent the operation of said throttle control member, means to actuate said stop means including means to render said preventive member inoperative and means associated with said throttle control member for locking said actuating means.

29. In a propulsion system, a main engine, an auxiliary engine normally disconnected from said main engine, means for reversing said main engine, means for operatively connecting said auxiliary engine to said main engine, means to limit the range of action of the reversing means, and means dependent upon said limiting means being operative for operatively connecting said auxiliary engine to said main engine.

30. In a propulsion system, a reversible main engine, an auxiliary engine operative to assist the main engine in forward operation, and means for preventing the reversal of said main engine dependent upon the auxiliary engine being in said operative condition.

31. In a propulsion system, a main engine having a control element, an auxiliary engine having an operating element, a locking element for engaging said operating element, a stop element for engaging said control element, control means for said stop element, control means for said locking element controlled by said stop element, and means for governing the stop element control means including said operating element.

32. In a propulsion system, a main engine having reversing means, an auxiliary engine for assisting said main engine in its forward or backward direction of operation, means for reversing said auxiliary engine, means for admitting motive power to said auxiliary engine, means to govern the last mentioned means, means for limiting the operation of the main engine reversing means, a master control including means to actuate said limiting means and render said governing means inoperative and control the direction of operation of the auxiliary engine, and means to govern the master control comprising an element of the means for admitting motive power to the auxiliary engine.

33. In a propulsion system, a main locomotive having a control means, an auxiliary engine having operating means, and means associated with both of said means adapted to limit the operation of said control means while operating the locomotive and auxiliary together and preclude the operation of the auxiliary when it is desired to operate the locomotive alone.

34. In a propulsion system, a main locomotive having means to change its direction of operation at the election of the engineer, an auxiliary engine to assist the main locomotive having operating means, means to prevent the operation of the first mentioned means to change the direction of operation of the main locomotive, and means to render the last mentioned means ineffective and also prevent the operation of said operating means.

35. In combination, a main engine having a reversing means, an auxiliary engine having an operating means, a movable stop member to engage said reversing means, a movable stop member to engage said operating means, means to move said stop members comprising a plunger associated with the first stop member, a plunger associated with the second stop member, a source of pressure air supply, means to supply said air to operate said plungers thereby moving said stop members, a member to control the air to the first mentioned plunger, the latter plunger controlling the air to the second mentioned plunger, and means preventing the operation of said control member when the operating means is in its effective position.

36. In combination, a main engine with its reversing means movable to a forward and backward operating position, an auxiliary engine with its throttle lever movable to an open and closed position, a guard member movable to limit the operation of the reversing means, a lever for effecting the movement of the guard member, and interlocking means between said levers to prevent the movement of the throttle lever to open position when the guard member is in its ineffective position and govern the movement of the guard to the latter position when the throttle lever is in its open position.

37. In combination, a main locomotive with its reversing gear movable to a forward and backward operating position, an auxiliary engine with its throttle lever movable to an open and closed position, a guard member to prevent the movement of the reversing gear to reverse the main locomotive, a stop member to prevent the movement of the throttle lever to its open position, a master lever to remove said stop, a member for operating said guard member associated with said master lever, and a stop member associated with said throttle lever for governing said master lever.

38. In combination, a main engine with a reversing gear movable to a forward and rearward position, an auxiliary engine with its throttle lever movable to an open and closed position, a guard member to prevent the movement of the reversing gear to reverse the main locomotive, a stop means to prevent the movement of the throttle lever to its open position, a master control to govern the stop means and render the guard member effective and ineffective, and means to assure the closing of the throttle before the guard member is rendered ineffective.

39. In combination, a main engine with its reversing gear having a forward and backward operating position, an auxiliary engine with its throttle gear movable to an open and closed position, a guard member to limit the reversing gear to the operation of the main engine to one direction, a second guard member to limit the reversing gear to the operation of the main engine to the reverse direction, a second reversing gear for the auxiliary engine, means to prevent the operation of the throttle gear, means to select a guard member in accordance with the desired direction of operation of the auxiliary engine and render it effective, and means depending upon the effective operation of said selecting means to render said preventive means ineffective.

40. In combination, a main engine with its reversing gear having a forward and backward operating position, an auxiliary engine with its throttle gear movable to an open and closed position, a guard member to limit the reversing gear to the operation of the main engine to one direction, a second guard member to limit the reversing gear to the operation of the main engine to the reverse direction, a second reversing gear for the auxiliary engine, means to prevent the operation of the throttle gear, means to select a guard member in accordance with the desired direction of operation of the auxiliary engine and render it effective and ineffective, means depending upon the effective operation of said selecting means to render said preventive means ineffective, and means to assure the throttle gear being placed in its closed position before the operation of the selecting means to render said guard member ineffective.

41. In a propulsion system, a reversible main engine, a reversible auxiliary engine operative to assist the main engine in either forward or backward operation, and means for correlating the direction of operation of said engines including means for preventing the reversal of the main engine dependent upon the auxiliary engine being in an operative condition.

In testimony whereof I hereunto affix my signature.

NEVIL GREENWELL.